United States Patent [19]

Pacitti

[11] Patent Number: 4,845,884
[45] Date of Patent: Jul. 11, 1989

[54] FISHING LINE FLOAT

[76] Inventor: Thomas G. Pacitti, 220 Mountain St., Philadelphia, Pa. 19148

[21] Appl. No.: 250,415

[22] Filed: Sep. 28, 1988

[51] Int. Cl.⁴ ............................................. A01K 93/00
[52] U.S. Cl. .................................. 43/44.88; 43/44.91; 43/44.93
[58] Field of Search .................. 43/43.1, 43.14, 44.87, 43/44.88, 44.9, 44.91, 44.93

[56] References Cited

U.S. PATENT DOCUMENTS

| | | | |
|---|---|---|---|
| 2,181,458 | 11/1939 | La Gue | 43/44.87 |
| 2,315,322 | 3/1943 | Fenley | 43/44.9 |
| 2,909,865 | 10/1959 | Ehlert | 43/43.11 |
| 3,106,797 | 10/1963 | Hancock | 43/43.11 |

Primary Examiner—Nicholas P. Godici
Assistant Examiner—William Scott Andes
Attorney, Agent, or Firm—Stanley Bilker

[57] ABSTRACT

A float for a fishing line comprises a buoyant bob member having a substantially L-shaped tube extending from one side to the bottom thereof to define intersecting tubular arms adapted to carry the line in slidable disposition therein when the line is slack and to frictionally engage the line in locked disposition when the line is taut as a result of a fish being hooked. A plurality of blind holes extend into and are circumferentially spaced about the bottom of the float to form pockets of air trapped therein by the force of the water to provide a drag anchor increasing resistance to the pull of the fish in attempting to get away.

17 Claims, 2 Drawing Sheets

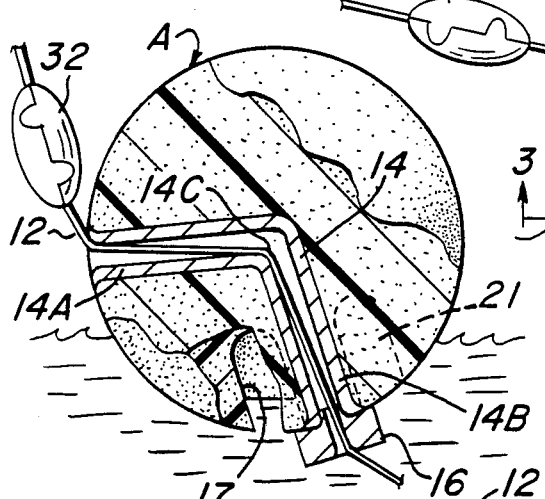
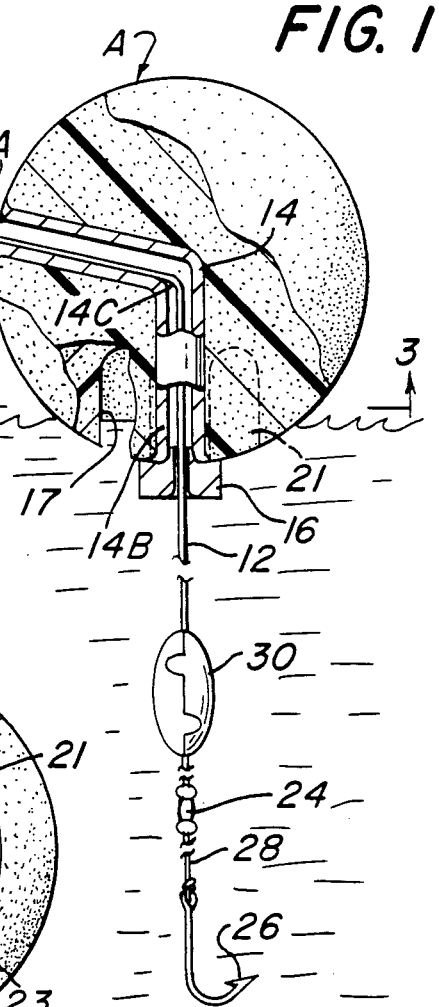
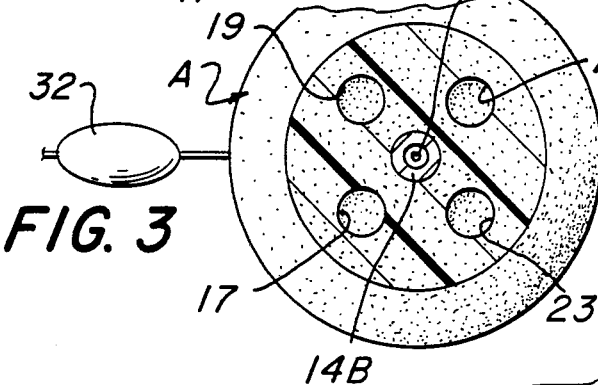
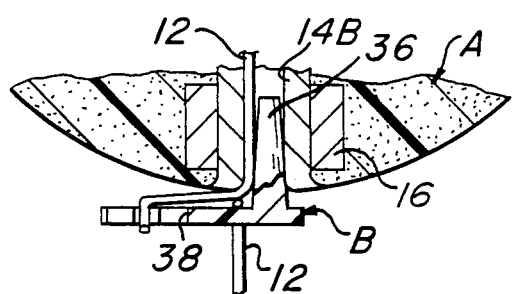

FISHING LINE FLOAT

BACKGROUND OF THE INVENTION (1) Field of the Invention

This invention relates to fishing tackle and more particularly relates to floats for fishing line. This invention is especially concerned with a bobo for a fishing line in which the float is slidable on the line and sits free on the surface of the water when the line is slack but locks frictionally upon the line when a fish strike causes the line to become taut and effects line tension. In particular, this invention relates to a float which incorporates additional drag and resistance to a hooked fish attempting to get away.

(2) Prior Art

U.S. Pat. No. 2,181,458 shows a float in which the line passes through offset guides and causes the line to bear frictionally against the bottom of the float during casting.

U.S. Pat. No. 2,315,322 demonstrates a fishing float having an axial passage intersected by a radial passage to define an encircling loop to position the hook at the appropriate water depth but not to effect tensioning. Another depth positioner for a hook is shown in U.S. Pat. No. 2,909,865 wherein the line is wrapped about a spiral groove to prevent hook interference during casting.

U.S. Pat. No. 3,106,797 discloses a fishing float for holding a predetermined length of line below the water surface until a strike is made, after which the line releases itself from being gripped and then to slide freely through the float eye without interfering with either playing or landing the fish.

OBJECTS OF THE INVENTION

None of the prior art patents teach or suggest the utilization of a float which furnishes additional drag to resist the struggles of a hooked fish attempting to get away while at the same time providing a bob which slides freely on a slack line but frictionally engages and locks upon a taut or tensioned line.

It is therefore an object of this invention to provide a float for a fishing line in which the float itself furnishes drag additional to the buoyancy of the bob in resisting a hooked fish's attempts to get away.

Another object of this invention is to provide a float which slides freely on a slack line but frictionally engages and locks upon a taut or tensioned line.

Still another object of this invention is to provide a slidable float for a fishing line in which the depth of the weighted hook can be accurately determined.

Yet still another object of this invention is to provide a float construction for a fishing line which can accommodate for hooking of very large fish as well as small fish.

A further object of this invention is to provide a slidable float for a fishing line in which the accuracy of the cast and hook depth can accurately be controlled.

Other objects of this invention are to provide an improved device of the character described which is easily and economically produced, sturdy in construction and both highly efficient and effective in operation.

SUMMARY OF THE INVENTION

The foregoing objectives are achieved by incorporating a substantially L-shaped tube extending from one side to the bottom within a bouyant float which is adapted to carry the line in slidable disposition when the line is slack but to lock frictionally on the line when tensioned thereon by the action of a hooked fish struggling to get away. A plurality of blind holes extending in and peripherally spaced about the bottom of the float entrap pockets of air as water is forced therein to create additional resistance to a hooked fish in the manner of a drogue anchor. Means are also provided to vary the depth of the hook below the surface of the water.

BRIEF DESCRIPTION OF THE FIGURES

With the above and related objects in view, this invention consists in the details of construction and combination of parts as will be more fully understood from the following detailed description when read conjunction with the following drawings, in which:

FIG. 1 is a side elevational view, and partly in section, of a fishing line float embodying this invention.

FIG. 2 is a side elevational view, and partly broken away, of the float in FIG. 1 being frictionally locked on the line by line tension.

FIG. 3 is a sectional view taken along lines 3-3 of FIG. 1.

FIG. 6 is a partial perspective view of a float plug for varying depth of the hook as embodied in the present invention.

FIG. 7 is a fragmentary sectional view showing the float plug inserted in place.

DETAILED DESCRIPTION

Figure 4:
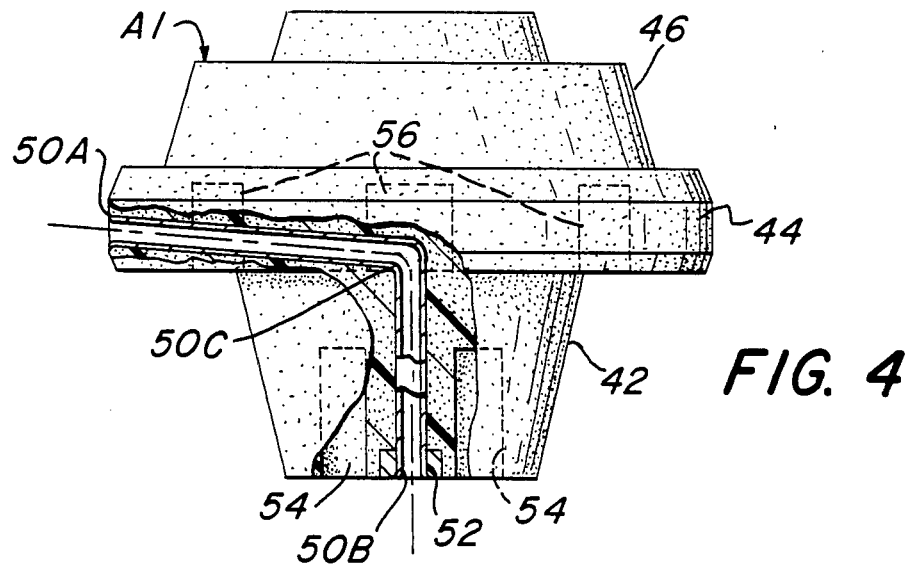
FIG. 4 is a side elevational view, and partly in broken away, of a modified form of the present invention.

Referring now in greater detail to the drawings in which similar reference characters refer to similar parts, I show a fishing line float comprising a buoyant bob member, generally designated as A, coupled to a line 12 which has been cast by a rod (not shown) or trolled behind a boat.

In FIGS. 1 and 2, the float or bob A is of generally spherical configuration, molded of a suitable buoyant material, such as multi-cellular blown or foamed polystyrene, preferably of closed cell structure. The diameter of the spherical bob A may be in the range of about 1 inch to 6 inches. An internal substantially L-shaped tube is injection molded within the sphere or fit within two cemented hemispherical bob sections to define an inlet tubular arm 14A into which the line 12 is fed at the side of the bob A and an exit tubular arm 14B at the bottom portion thereof. A brass collar 16 is pressed about the terminal end of the tubular arm 14B and defines a weight which orients the bottom of the bob below the water surface. A plurality of blind holes 17, 19, 21 and 23 are bored or molded within the bob A and are radially disposed and circumferentially spaced from each other about the terminal end of the exit tubular arm 14B. These blind holes 17-23 extend to a depth of perhaps one-third the bob diameter and may be ¼ inch in diameter for the smaller bob sizes and ¾ inch in diameter for the larger sizes (6 inch bob).

The bind holes 17-23 act as to increase bob drag to a hooked fish struggling to get away by trapping air within the blind pockets when submerged so that the float operates as a drogue anchor by imparting additional resistance to fish motion. The line 12 is fed through the inlet tubular arm 14A and upon emerging from the exit arm 14B is attached to a swivel 24 and a conventional hook 26 through leader 28. A suitable sinker 30, such as a #300 split shot, is affixed to the line 12 above the hook 26.

When the baited hook 26 is cast by the angular with the bob abutting against the sinker-swivel-hook assembly, the bob A ultimately hits the surface of the water where it floats. As shown in FIG. 1, the line 12 slides freely through the L-shaped tube 14 and the baited hook 26 goes down toward the bottom. After a while, the float A will pop-up and down to indicate such bottoming. The fisherman now lifts his rod high and gives the bob A a chance to "slide down" the line 12. Slack is retrieved until the sinker 30 is off the bottom, and the steps are repeated until the angler reels in. The weighted collar 16 directs the bottom of the bob under water and positions the open end of the blind holes 17–23 below the water surface. When a fish strikes, the line 12 is drawn taut, as shown in FIG. 2, and the line tension on the inner radius 14C of the L-shaped tube 14 causes the bob A to frictionally engage the line whereby the float locks thereon.

The hooked fish now struggling to get away pulls the bob A below the surface of the water trapping pockets of air within the the hole reservoirs thereof. These air pockets now create additional resistance to the pulling fish by virtue of the drogue anchor effect.

In order to vary the depth of the baited hook 26 below the water surface, either a split shot 32 may be mounted above the bob A, as shown in FIG. 1 and 2, or a plug B may be inserted into the exit end of the L-shaped tube 14 (50) as shown in FIGS. 6 and 7, so that a predetermined length of line 12 is free to be paid out below the water surface. Where a split shot 32 acts as a stop above the bob A, the L-shaped tube becomes effectively inoperative as a frictionally engaging lock, except to the extent that the shot 32 itself is frictionally slidable on the line 12. Where plug B is inserted into the distal end of the L-shaped tube 14 (or pipe 50), the tube 14 (50) becomes inoperative as a line lock, except when a struggling fish pulls the plug B from the exit end of said tube.

Referring now to FIGS. 6 and 7, the plug B is a molded plastic or metal component comprising a flat dish portion 34 having a tapered insert 36 or conical tongue complementary with the inner diameter of the end of exit tube 14B (or tube 50B). The line 12 is threaded through an aperture 38 in the disk portion 34 by passing the line through a notched slit 40 communicating with the aperture with the tapered cone 36 facing away from the bob. When the plug B is mounted in the tube 14, the conical insert 36 is inverted after which the tapered end 36 is press fit within the terminal end of the exit tubular arm 14B. Now, the line is locked upon the float with the hook 26 controlled at the appropriate depth. The casting is as before, except that the baited hook 26 does not bottom on the water shelf but hangs at an appropriate depth thereabove. When a fish is hooked and struggles to get away, the line lock plug B is pulled out whereupon the taut line causes the float A to frictionally engage the line 12 and lock thereon as a result on the line tension against the inner radius 14C (50C).

Figure 5:
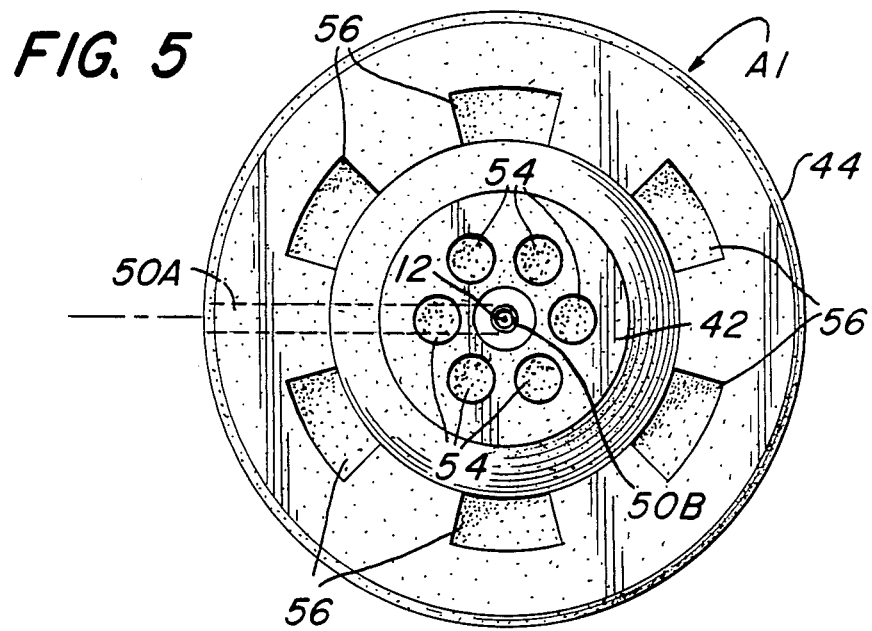
FIG. 5 is a bottom plan view of the float shown in FIG. 4.

Referring now to FIGS. 4 and 5, there is shown a modified form of my float which is adapted for catching larger fish, such as sharks or game fish. Here, the bob A1 has a truncated conical base 42, a medical cylindrical waist 44 and a cap portion 46, all doweled together or injection molded into a single unitary structure.

The bob A1 is also fabricated of expanded styrofoam but in girths of up to 24 inches or wider and heights of 20 inches or greater. A substantially L-shaped chrome-plated copper pipe or tube 50 is contained within the float A1 and extends from the side of the waist 44 interiorly to the bottom of the truncated cone 42. A plated collar 52 is mounted about the terminal end of tubular arm 50B and acts as a weight to keep the conical base 42 submerged below the water lever. A plurality of peripherally-spaced blind reservoirs 54 are formed in the bottom of the truncated base 42 by boring or other suitable means. A plurality of blind slotted wells 56 are circumferentially spaced within the bottom of the cylindrical waist 44 to define secondary pockets for trapping air in order to increase drag when a large fish pulls the waist portion 44 of the bob A1 under the water. As is apparent the plug B used with the modified flat A1 would have a larger plug 36 complementary with exit tube 50B, and the line 12 used with the larger float would be cord or twine to handle the weight of larger fish. Should a hooked fish pull the insert 36 from its locked position within the terminal end 50B of tube 50, the frictional engagement of the cord 12 within the L-shaped tube 50 will lock the float A1 to the line in a manner previously described. When the pulling force of the hooked fish is sufficient to draw the waist 46 below the water surface, the blind reservoirs 56 in addition to the wells 54 will trap air and operate as drogues to provide added resistance for wearing out the fish.

Although this invention has been described in considerable detail, such description is intended as being illustrative rather than limiting, since the invention may be variously embodied without departing from the spirit thereof, and the scope of the invention is to be determined as claimed.

I claim:

1. A float for a fishing line having a weighted hook at the end thereof comprising:
   a buoyant bob member,
   a substantially L-shaped tube within the bob member extending from one side to the bottom thereof to define intersecting tubular arms adapted selectively to carry the line in slidable disposition when the line is slack and to frictionally engage said line in substantially locked disposition therein between the interior edge of the intersection and the outer marginal edges of the respective tubular arms when the line is tensioned by a fish pulling away, and
   a plurality of blind holes circumferentially spaced about the bottom of said tube defining pockets of air trapped in the blind holes by the force of water forced therein to produce additional drag when a fish pulls away.

2. The float of claim 1 wherein weight means at the bottom of the bob insures that the open end of the blind holes will be partially submerged when the bob is in normal floating position.

3. The floating of claim 1 including an adjustable stop on the line above the bob to set the position of the hook below the water surface.

4. The float of claim 1 wherein the bob is of spherical configuration.

5. The float of claim 1 wherein the bob is of frustroconical configuration weighted at the narrow end.

6. The float of claim 5 including a cylindrical waist above the frustro-conical portion.

7. The float of claim 6 wherein a plurality of blind circumferentially-spaced pockets are formed at the bottom portion of said cylindrical waist adapted to provide additional drag when said waist is submerged.

8. The float of claim 1 including a plug for insertion into the bottom end of said L-shaped tube to wedge the line therein at a position determining the level of the hook below the water line.

9. The float of claim 8 wherein the plug includes a plate portion having an opening therein adapted to receive the line and a conically tapered portion for insertion within the tube and adapted to be pulled out by the action of a fish attempting to get away.

10. A float for a fishing line comprising a buoyant bob member, a tube extending through said bob member and slidably carrying the line therein, a plurality of blind holes peripherally spaced about the line exiting end of said tube, means to weight said bob member so that the open ends of said blind holes are submerged below the water line, and means to lock said bob member to said line whereby pockets of air are trapped in the blind holes by the force of water pushed therein by a hooked fish to provide additional drag.

11. The float of claim 10 wherein the means to lock is on a portion of the line above the bob member.

12. The float of claim 10 wherein the means to lock in on a portion of the line below said bob member.

13. The float of claim 10 wherein the means to lock is defined by the tube being in L-shaped configuration having intersecting tubular arms extending from the side of the bob member to the bottom thereof and frictionally engaging the line when tensioned by a hooked fish.

14. The float of claim 10 wherein the bob member is substantially spherical in configuration.

15. The float of claim 10 wherein the float is frustroconical in configuration.

16. A float for a fishing line comprising a bob member, a substantially L-shaped tube extending interiorly from one side of said bob member to the bottom thereof to define intersecting tubular arms adapted to carry the line in slidable disposition therein when the line is slack and to frictionally engage the line in substantially locked disposition therein when the line is tensioned by a hooked fish attempting to pull away.

17. The float of claim 16 wherein said bob member includes a plurality of blind holes circumferentially spaced about the line exiting end of said L-shaped tube to provide additional drag on a fish being hooked as a result of air trapped in the blind holes by the force of water in the manner of a drogue anchor.

* * * * *